United States Patent
Bouillet et al.

(10) Patent No.: US 8,380,965 B2
(45) Date of Patent: Feb. 19, 2013

(54) CHANNEL-BASED RUNTIME ENGINE FOR STREAM PROCESSING

(75) Inventors: Eric Bouillet, Hawthorne, NY (US); Hanhua Feng, Hawthorne, NY (US); Zhen Liu, Hawthorne, NY (US); Anton V. Riabov, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 12/485,592

(22) Filed: Jun. 16, 2009

(65) Prior Publication Data
US 2010/0318768 A1    Dec. 16, 2010

(51) Int. Cl.
G06F 9/00    (2006.01)
(52) U.S. Cl. ............................... 712/220
(58) Field of Classification Search ........... None
See application file for complete search history.

(56) References Cited

U.S. PATENT DOCUMENTS

| | | | | |
|---|---|---|---|---|
| 5,471,627 A * | 11/1995 | Means et al. | ..................... | 712/19 |
| 2007/0288635 A1 * | 12/2007 | Gu et al. | ..................... | 709/226 |
| 2008/0005392 A1 * | 1/2008 | Amini et al. | ..................... | 710/29 |
| 2008/0250390 A1 * | 10/2008 | Feblowitz et al. | ..................... | 717/114 |
| 2008/0256166 A1 * | 10/2008 | Branson et al. | ..................... | 709/201 |
| 2009/0171999 A1 * | 7/2009 | McColl et al. | ..................... | 707/101 |

OTHER PUBLICATIONS

D. Abadi, Y. Ahmad, M. Balazinska, U. Cetintemel, M. Cherniack, J.-H. Hwang, W. Lindner, S.S. Maskey, A. Rasin, E. Ryvkina, N. Tatbul, Y. Xing, and S. Zdonik. The design of the borealis stream processing engine. In CIDR, 2005.
A. Arasu, S. Babu, and J. Widom. The cql continuous query language: Semantic foundations and query execution. The VLDB Journal, 15(2):121-142, 2005.
D. Carney, U. Centinternel, M. Cherniack, C. Convey, S. Lee, G. Seidman, M. Stonebraker, N. Tatbul, and S. Zdonik. Monitoring streams—a new class of data management applications. In VLDB, pp. 215-226, 2002.
S. Chandrasekaran, D. Cooper, A. Deshpande, M. Franklin, J. Hellerstein, W. Hong, S. Krishnamurthy, S. Madden, V. Raman, F. Reiss, and M. Shah. TelegraphCQ: Continuous dataflow processing for an uncertain world. In CIDR, 2003.
M. Cherniack, H. Balakrishnan, M. Balazinska, D. Carney, U. Centintemel, Y. Xing, and S. Zdonik. Scalable distributed stream processing. In CIDR, 2003.
J. Dean and S. Ghemawat. MapReduce: Simplified data processing on large clusters. In OSDI, pp. 137-150, 2004.
B. Gedik, H. Andrade, K.-L. Wu, P.S. Yu, and M. Doo. SPADE: the system s declarative stream processing engine. In SIGMOD, pp. 1123-1134, 2008.

(Continued)

*Primary Examiner* — Jacob A Petranek
(74) *Attorney, Agent, or Firm* — William J. Stock; F. Chau & Associates, LLC

(57) ABSTRACT

An apparatus to facilitate design of a stream processing flow that satisfies an objective, wherein the flow includes at least three processing groups, wherein a first processing group includes a data source and an operator, a second processing group includes a data source and an operator and a third processing group includes a join operator at its input and another operator, wherein data inside each group is organized by channels and each channel is a sequence of data, wherein an operator producing a data channel does not generate new data for the channel until old data of the channel is received by all other operators in the same group, and wherein data that flows from the first and second groups to the third group is done asynchronously and is stored in a queue if not ready for processing by an operator of the third group.

21 Claims, 12 Drawing Sheets

OTHER PUBLICATIONS

L. Girod, Y. Mei, R. Newton, S. Rost, A. Thiagarajan, H. Balakrishnan, and S. Madden. XStream: a signal-oriented data stream management system. In ICDE, pp. 1180-1189, 2008.

M.I. Gordon, W Thies, and S. Amarasinghe. Exploiting coarse-grained task, data, and pipeline parallelism in stream programs. In ASPLOS, pp. 151-162, 2006.

Y. Yu, M. Isard, D. Fetterly, M. Budiu, Ulfar Erlingsson, P.K. Gunda, and J. Currey. DryadLINQ: A system for general-purpose distributed data-parallel computing using a high-level language. In OSDI, pp. 1-14, 2008.

M. Isard, M. Budiu, Y. Yu, A. Birrell, and D. Fetterly. Dryad: Distributed data-parallel programs from sequential building blocks. In EuroSys, pp. 59-72, 2007.

R. Motwani, J. Widom, A. Arasu, B. Babcock, S. Babu, M. Dater, G. Manku, C. Olston, J. Rosenstein and R. Varma. Query processing, approximation, and resource management in a data stream management system. In CIDR, 2003.

K. Olukotun and L. Hammond. The future of microprocessors. ACM Queue, 3(7):26-29, 2005.

M. Stonebraker, D. Abadi, A. Batkin, X. Chen, M. Cherniack, M. Ferreira, E. Lau, A. Lin, S. Madden, E. O'Neil, P. O'Neil, A. Resin, N. Tran, and S. Zdonik. C-Store: A column-oriented DBMS. In VLDB, pp. 553-564, 2005.

H. Sutter and J. Larus. Software and the concurrency revolution. ACM Queue, 3(7):54-62, 2005.

W. Thies, M. Karczmarek, and S. Amarasinghe. Streamlt: A language for streaming applications. In CC, pp. 49-84, 2002.

* cited by examiner

CHANNEL-BASED RUNTIME ENGINE FOR STREAM PROCESSING

BACKGROUND OF THE INVENTION

1. Technical Field

The present invention relates to stream processing in a concurrent system, such as, multi-core computers and computer clusters.

2. Discussion of the Related Art

Massive multi-core systems hold the promise of greatly improving the performance of multi-threaded applications. Unfortunately, the complexity of multi-core systems has been difficult for the entire information technology (IT) industry. Concurrent programming is notoriously hard. For example, making a robust software system that runs on a cluster of multi-core computers in a cost-effective way is already beyond the reach of average software engineers. If not carefully designed, multi-threaded applications can suffer from high costs of data movement and inefficient central processing unit (CPU) usage. With the performance of a single core pushed to its limit, in the foreseeable future developers will take advantage of concurrent programming models to design and implement competitive software systems.

Stream processing is one of the programming models for concurrent applications. In contrast to the "pull-based" model used by conventional database management systems, stream processing applications use a "push-based" data access model. In a typical asynchronous stream processing system, a stream processing application is described with a flow diagram represented by a graph of operators. FIG. 1 shows an example of a stream processing application that analyzes weather and energy consumption data. In FIG. 1, data from two different sources is first processed independently, and then, the processing results are jointly analyzed by a set of operators. Each operator consumes zero or more input streams and produces zero or more output streams.

As each relation in a database management system is often understood as a table, a stream in a stream processing system can be considered as a sequence of tuples containing multiple attributes (also known as fields). Stream processing systems have a great advantage over conventional database systems for continuously generated data whose size is too large to store in a conventional database management system, and for event-based data whose diminishing relevance nullifies the importance of persistent storage.

Stream processing applications achieve concurrency through asynchronicity. For example, incoming tuples of an operator can be queued if the operator is busy processing an earlier tuple. For systems with multiple processor cores, operators can be placed in different cores or machines so that the processing can be pipelined or executed in parallel. For the example in FIG. 1, the processing of operators W1 and W2 can be pipelined, and both executed in parallel with operator W3 when a tuple is received from the source.

SUMMARY OF THE INVENTION

In an exemplary embodiment of the present invention, an apparatus, comprises: a memory device for storing a program; and a processor in communication with the memory device, the processor operative with the program to: facilitate design of a stream processing flow that satisfies an objective, wherein the stream processing flow includes at least three processing groups, wherein a first processing group includes a data source and at least one operator, a second processing group includes a data source and at least one operator and a third processing group includes a join operator at its input and at least one other operator, wherein data inside each group is organized by channels and each channel is a sequence of data, wherein an operator producing a data channel does not generate new data for the channel until old data of the channel is received by all other operators in the same group, and wherein data that flows from the first and second groups to the third group is done asynchronously and is stored in a queue if not ready for processing by an operator of the third group; and deploy the stream processing flow in a concurrent computing system to produce an output.

A data channel inside each group is a sequence of values of the same type.

Data channels of the same group share the same sequence of sequence numbers or timestamps.

Each data channel of a group receives its values from a single operator and operators in the group can use any channel in the group as an input, on the condition that there are no dependency loops or cycles within the group.

Operators in the same group are scheduled sequentially in a fixed order and instructions of an operator are executed continuously without overlapping in time with instruction of any other operators in the same group, and wherein instructions of operators belonging to different groups can be executed in parallel in any order.

The processor is further operative with the program to decompose a group of the stream processing flow into a plurality of smaller groups.

A pair of sender/receiver operators is inserted between the smaller groups if a link in the stream processing flow is broken by the decomposition, and wherein data between a sender/receiver pair can be stored in a queue.

A join operator is inserted into a smaller group if the smaller group into which it is inserted requires data from two or more smaller groups as a result of the decomposition.

The operators are stored in a library.

The operators are designed by a user.

A description of the stream processing flow is received from a user or is computer-generated.

In an exemplary embodiment of the present invention, an apparatus, comprises: a memory device for storing a program; and a processor in communication with the memory device, the processor operative with the program to: facilitate design of a stream processing flow that satisfies an objective, wherein the stream processing flow includes at least one processing group that includes a data source and at least one operator or at least one compound, and wherein the at least one compound includes at least one operator or at least one smaller compound, wherein data inside one or more processing groups is organized by channels and each channel is a sequence of data, wherein an operator producing a data channel does not generate new data for the channel until old data of the channel is received by all other operators in the same group, and wherein data that flows from one processing group to another is done asynchronously and is stored in a queue if not ready for processing by an operator of the receiving processing group; and deploy the stream processing flow in a concurrent computing system to produce an output.

The at least one compound is a branching compound if it has multiple disjoint branches, each branch contains multiple operators, and depending on a condition, only one of the branches is executed for each input when the stream processing flow is deployed.

The at least one compound is a partitioning compound replicated for each value of an associated key channel, and wherein for each input depending on the value of the key channel only one copy of the at least one compound is executed when the stream processing flow is deployed.

The partitioning compound is replicated throughout multiple computers depending on the value of the key channel when the stream processing flow is deployed.

The processor is further operative with the program to: build deployable sub-flows, wherein the processor is further operative with the program when building deployable sub-flows to: decompose the at least one processing group into a plurality of separate processing groups, wherein the plurality of separate processing groups includes a first processing group that includes all upstream operators of a partitioning compound, a second processing group that includes all downstream operators of the partitioning compound and a third processing group that includes the partitioning compound and wherein sender/receiver pairs are added between the first to third processing groups; replicate the partitioning compound and the added sender/receiver pairs to a number of copies; add a dispatch operator and a branching compound containing the same number of branches to the first processing group; move senders into the branching compound and make each of them a separate branch of the branching compound; and add a join operator to join data received from the copies of the partitioning compound.

The at least one operator or at least one compound is stored in a library.

The at least one operator or at least one compound is designed by a user.

A description of the stream processing flow is received from a user or is computer-generated.

In an exemplary embodiment of the present invention, one or more computer readable media having stored thereon a plurality of instructions that, when executed by one or more processors, causes the one or more processors to: facilitate design of a stream processing flow that satisfies an objective, wherein the stream processing flow includes at least three processing groups, wherein a first processing group includes a data source and at least one operator, a second processing group includes a data source and at least one operator and a third processing group includes a join operator at its input and at least one other operator, wherein data inside each group is organized by channels and each channel is a sequence of data, wherein an operator producing a data channel does not generate new data for the channel until old data of the channel is received by all other operators in the same group, and wherein data that flows from the first and second groups to the third group is done asynchronously and is stored in a queue if not ready for processing by an operator of the third group; and deploy the stream processing flow in a concurrent computing system to produce an output.

In an exemplary embodiment of the present invention, one or more computer readable media having stored thereon a plurality of instructions that, when executed by one or more processors, causes the one or more processors to: facilitate design of a stream processing flow that satisfies an objective, wherein the stream processing flow includes at least one processing group that includes a data source and at least one operator or at least one compound, and wherein the at least one compound includes at least one operator or at least one smaller compound, wherein data inside one or more processing groups is organized by channels and each channel is a sequence of data, wherein an operator producing a data channel does not generate new data for the channel until old data of the channel is received by all other operators in the same group, and wherein data that flows from one processing group to another is done asynchronously and is stored in a queue if not ready for processing by an operator of the receiving processing group; and deploy the stream processing flow in a concurrent computing system to produce an output.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
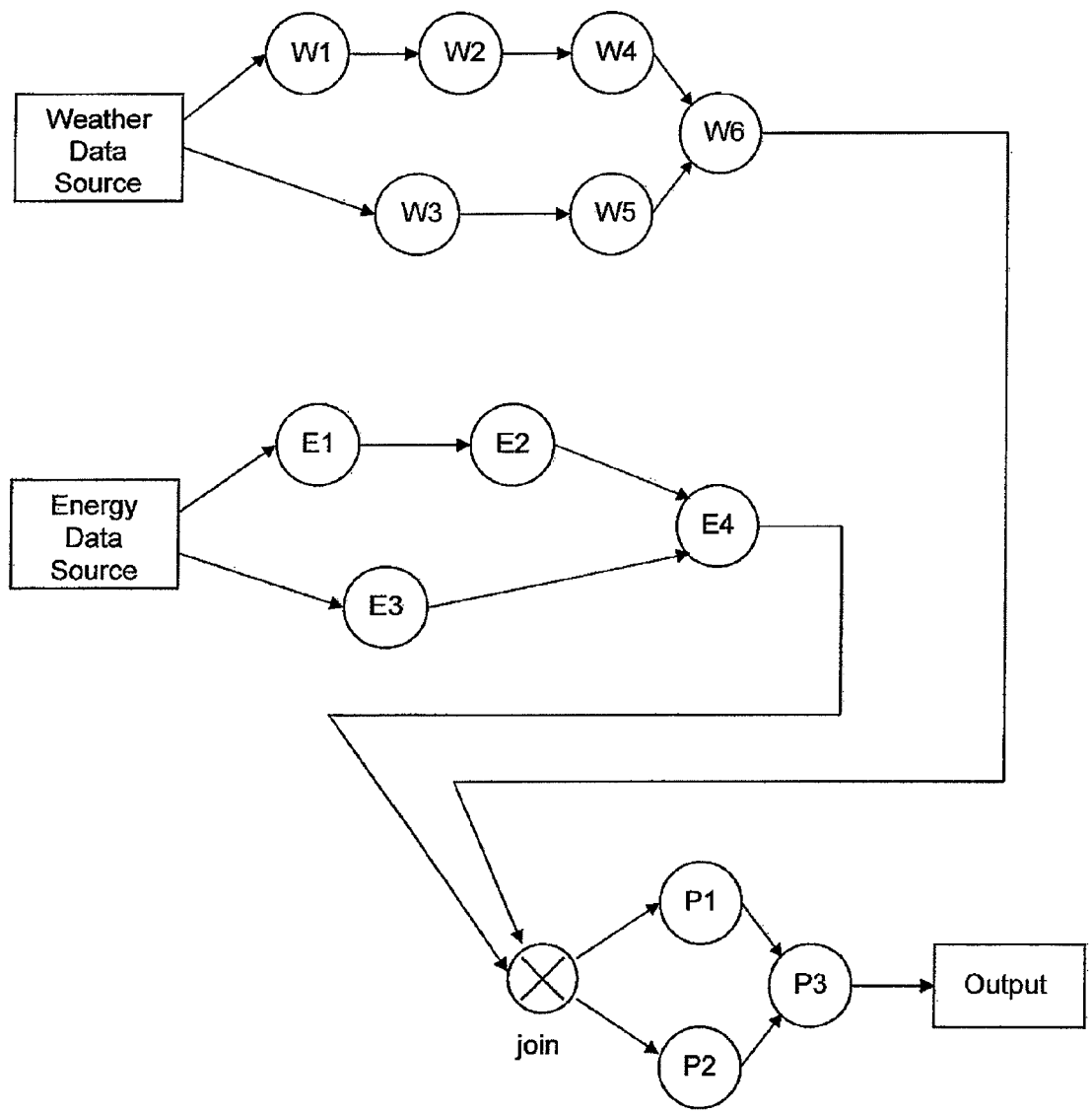
FIG. 1 is an example of a stream processing flow that correlates energy consumption with weather forecast.

This disclosure presents a channel-based runtime engine for stream processing (CRESP), in accordance with an exemplary embodiment of the present invention. This disclosure further presents a programming model for use with CRESP and traditional flow-based models, in accordance with an exemplary embodiment of the present invention. This framework includes a host of layered structures and constraints added into the stream flow diagram, aiming to improve performance, programmability and functionality. CRESP exposes the layered structures and constraints for schedulers to execute operators efficiently with low overhead across threads or machines. CRESP provides advantages over traditional stream processing engines.

CRESP uses a two-level approach to maintain synchronicity of data fields. For example, a stream processing application is designed as a flow of processing groups, and each processing group contains a flow of operators. With this approach, single-threaded schedulers are able to eliminate queuing costs within a processing group. At run-time, a flow of processing groups can be decomposed into smaller sub-flows, and these sub-flows are then deployed to multiple cores or machines, scheduled concurrently to achieve better performance. In CRESP, queues between these sub-flows are inserted automatically, possibly involving the introduction of joins to resynchronize data that lose their synchronicity in the queues.

Most stream processing engines use tuples to organize input and output data elements for user-defined operators. This creates excessive data movements if operators have to forward unused data, and extra transform operations if the tuple format of a data producer does not agree with that of a data consumer. As developers usually manually handle these cases, the operator code is poor in terms of reusability. CRESP avoids this by organizing data within a processing group into channels, and connecting the data to operators when deploying a flow. Note that a channel is a sequence of values with the same data type. Thus, if we think of a channel as a column in a table, then organizing the present and historical data in channels is similar to the idea of storing database tables in columns.

In CRESP, operators can return information to help schedulers make better decisions to improve performance by avoiding data accumulation in queues. As communication links are handled by pairs of operators that return the same kind of information to schedulers, flow control is then handled in the same way as central processing unit (CPU) scheduling.

Exploiting special system-level constructs called partitioning compounds, CRESP is able to partition an input data sequence into independent sub-sequences. Such data partitioning can be adjusted according to the load of each sub-flow at runtime. As the inserted queues and communication links are not part of original flow specifications provided by users, CRESP is free to re-optimize the decomposition and operator placements during the execution of the flow, and dynamically create parallel sub-flows to process the sub-sequences.

For multi-core machines, CRESP takes advantage of lock-free queues along with immutable objects to minimize communication costs between processing groups. Our stream processing framework and runtime engine is designed such that the entire system is lock-free in general, although locks are still used during the bootstrapping stage of the system and/or the initialization stage of an application, primarily for simplicity Unlike traditional models where a flow is presented by a single-level graph, in the CRESP model the flow has a hierarchical representation. For example, its processing groups contain not only operators but possibly operator-containing compounds which in turn may contain smaller compounds as elements. This hierarchical structure defines the boundaries within which the scheduling and decomposition algorithms can optimize their decisions dynamically and in a concurrent environment.

The rest of this disclosure is organized as follows. We first describe the structure of our stream processing model (i.e., CRESP), such as, synchronicity, static assignment channels, and branching and partitioning compounds. Then, we discuss parts of the deployment stage, such as communication pairs, decomposition and data storage, followed by an exemplary real-world flow of our model.

The Stream Processing Model

In the following, we present some enhancements that CRESP adds to conventional models.

Asynchronicity and Channels

Consider the stream processing application shown in FIG. 1. The weather and energy data coming from different sources have to be joined asynchronously before they can be processed. Depending on the application, the join operation can be expensive and complex. In a pure asynchronous model, any operators receiving two or more input streams have to be able to join data, including, for example, operators W4, W5, W6, E4, and P3 in FIG. 1. Although these extra join operators induced by asynchronicity have simple join conditions (i.e., to join with equal sequence numbers), they complicate the operators' code and create significant overhead.

CRESP avoids this by adopting a hybrid model consisting of both synchronous and asynchronous components. For example, in CRESP, a stream processing flow is a flow of operator groups, and each group contains a set of operators that can be scheduled synchronously. Thus, we can divide the entire flow of FIG. 1 into three synchronous operators groups. For example, a weather processing group that contains the weather data source and operators W1-W6, an energy processing group that contains the energy data source and operators E1-E4, and a joint-processing group that contains the rest of the operators.

Other issues with the application in FIG. 1 remain. Suppose, for example, that operator W2 needs some information from the weather data source that is not used by W1. Then we have two options: either W1 has to forward such unused information from its input to its output, as shown in FIG. 1, or we need a direct connection from the weather data source to W2. Since the size of a tuple is quite large (from tens to hundreds of fields), neither option is acceptable because it is tedious and error prone to repeatedly copy unused fields from input to output or to define too many different types of output streams. Further, both options introduce additional data movement and increase programming complexity.

Let us consider another issue with the application in FIG. 1. Suppose, for example, that two developers wrote operators W1 and W2 independently, but later they found out that, even though the output tuple of W1 contains all the attributes that W2 wants, the names of these attributes are different. Then, they have to insert another so-called "data transform operator" in between W1 and W2 to convert to different tuple types. Although a generic transform operator may be used to avoid boilerplate code, it frequently becomes a performance bottleneck in some applications requiring high throughput.

CRESP avoids these two issues by managing data fields in a conventional tuple-based model individually as data channels. For example, in CRESP, each operator can address its input channels by name, and its output data is written to independent channels instead of data fields within a tuple. Further, no two operators (including a data source) can write to the same channels. Our CRESP model will be described in more detail through the following definitions of terminology.

Channels. A channel is a sequence of values of the same type. For example, periodic temperature reading and humidity reading are two different channels.

Sequence numbers and timestamps. Every value of a channel has an associated integer-valued sequence number. The sequence numbers of a channel are always incremental. If a channel represents a time series, each of its values may also have a monotonically increasing timestamp.

Operators. An operator consumes zero or more channels, and produces zero or more channels. An operator may be stateful. For example, it may maintain its own internal states.

It may also communicate with the outside world or other parts of the application by other means.

Synchronous channels. A set of channels is synchronous, if values of the channels corresponding to a same sequence number are derived from the same event. Alternatively, we say that these channels share sequence numbers. If a channel is a function of a set of synchronous channels it must share their sequence numbers. For example, the channel of hourly heat index shares the same sequence numbers with two synchronous channels of hourly humidity and hourly temperature, as the heat index is a function of temperature and humidity. Note that a pair of synchronous channels may have a cause-effect relationship. For instance, the input and output channels of an operator are the cause and the effect, respectively.

Processing groups. A processing group contains a set of synchronous channels and operators that produce these channels as their output. In other words, all output channels of operators within a processing group share sequence numbers. In fact, we consider these shared sequence numbers (and also the shared timestamps, if applicable) as a special channel within the same processing group. Every operator (and hence every channel) must have an associated processing group.

Single-assignment rule. The values of a channel come from a single operator. In other words, every output channel of an operator is unique. For example, channels produced by one operator are not overwritten by another operator. Note that the name "single-assignment rule" is borrowed from functional languages. For example, we may consider an operator in stream processing as a kind of generalized function, with input channels as generalized variables and output channels as return values. In this sense, single-assignment means a channel, since the entire sequence of values as a whole is bound to a fixed output channel of a fixed operator.

Active operators. Active operators may generate new sequence numbers (and timestamps, if applicable). Operators without input channels, i.e., the source operators, are active operators.

Passive operators. Passive operators preserve sequence numbers during their processing, and they cannot generate new sequence numbers. Their input and output channels are always synchronous. In other words, during each invocation, the input and output values of a passive operator always correspond to the same event. Operators without output channels, i.e., sink operators, are passive operators.

Subscription. Channels of one processing group may be used by another group. In this case, we say that there is a subscription between the groups, and the former is the publisher of the subscription, and the latter is the subscriber.

Subscriptions are indirect and asynchronous and the data of the subscription may be stored temporarily in a queue before it can be consumed. In contrast, channels of the same group can be used directly and synchronously without any queues, assuming that the operators are executed according to their dependency order. A subscription can be requested by an active operator, or sent directly to a set of passive operators in another group. For the latter case, the subscription itself is considered as an active operator of the subscriber group.

Alternatively, we may view the set of all channels within a processing group as a data table with these channels as columns. Passive operators in the group can only add new columns whereas active operators may also append rows. Unlike columns in a table, there is no particular ordering of channels. Every operator in a group can refer to and make use of any channels directly through name. Since the single assignment rule implies each channel has a unique producer, the data dependency between an upstream operator and a downstream operator is clear. Such dependencies can be described by a directed graph where operators are represented by nodes. An edge (u, v) in this graph indicates that the operator v uses as its input one or more output channels of the operator u. This graph must satisfy the following requirement to avoid circular dependencies: the graph representation of a processing group must be a directed acyclic graph (DAG), i.e., a graph that contains neither cycles nor loops.

Because of the single assignment rule, groups containing cycles or loops cannot exist. We allow cycles and loops between processing groups, though. A loop appears when an operator refers to its own channels asynchronously through a self-subscription. Note that, with loops or cycles, designers must be aware of the possibility of data explosion.

Figure 2:
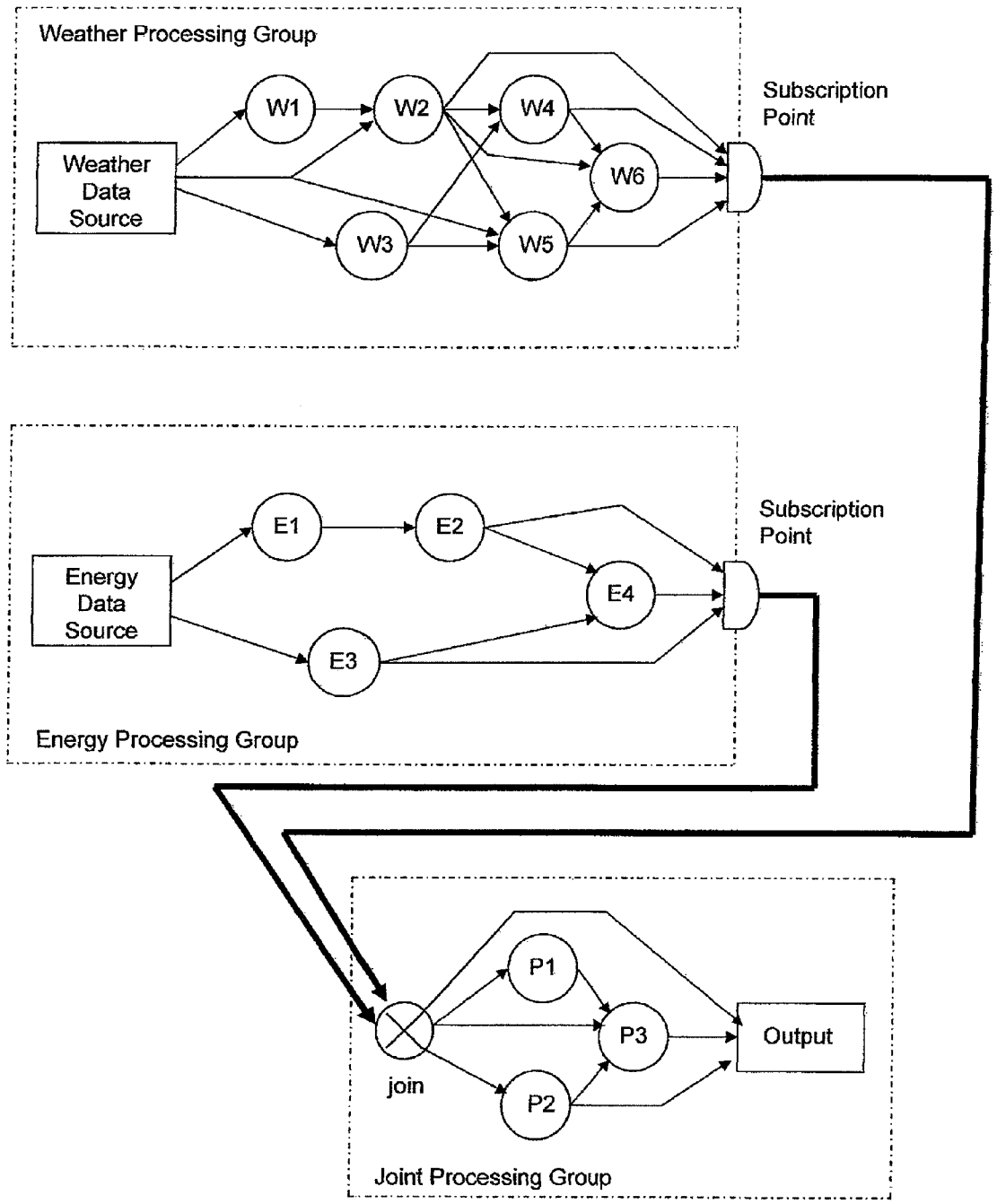
FIG. 2 shows the flow of FIG. 1 expressed using a channel-based runtime engine for Stream Processing (CRESP) model according to an exemplary embodiment of the present invention.

Now, we can replace the asynchronous model of FIG. 1 with our two-level model in FIG. 2. The flow graph is divided into three sub-graphs, i.e., three processing groups of operators. Thin edges, in the graph theory context, represent direct uses of one or more channels and thick edges, in the graph theory context, are subscriptions. There exists only one join operator in the entire flow, whose semantics must be explicitly defined by the developer. The public channels are managed at the ends of the processing groups and subscribed by the join operator. Within the flow, only the join operator and the two data sources are active operators. The remaining operators are all passive. Without any join overhead, additional edges are created within the same processing group in FIG. 2 to free intermediate operators from forwarding unused data fields.

Our CRESP model is more general than both the synchronous and asynchronous models. We can convert a purely asynchronous flow to our model by using a single processing group and convert a purely asynchronous one by using a processing group for each operator. This two-level model will greatly improve the efficiency of singlethreaded scheduling. Moreover, programmers are encouraged to write small operators. In contrast, with a typical asynchronous model, in order to eliminate joins, data movements, and transforms, programmers tend to write bigger operators.

Similar to many existing flow-based streaming programming models, we distinguish between operator development and flow development. In our current implementation, some operators are already provided by the system, and others are written by developers. The flow graph is provided by a flow specification file in the extensible markup language (XML) format. Note that the channel names specified by the operators may be different from the channel names in the flow specification, much like the difference between formal parameters and actual parameters in programming languages. When a flow is compiled or loaded, the actual channels are linked with operators dynamically, and at this moment cycles and loops can be detected. Channels are linked to operators by usage, and operators do not need to forward unused channels. In addition, even if an operator may use two or more channels generated by another operator, the values of these channels are not explicitly organized as tuples. Although the values of a fixed sequence number from all channels may be considered as a single tuple from outside of a processing group, for a given operator within the group, this tuple can have undefined attributes when this operator is invoked.

Null Values and Operator Bypassing

As defined, a channel is a sequence of values of a fixed type representing data of the same kind. In CRESP, a channel is either one of the pre-defined standard types or a user-defined type. As an example, a channel may hold a sequence of images, and then we can write an operator to extract widths and heights of these images and assign them to two independent channels.

In CRESP, channel values may be null, even for primitive types such as numbers. Operators are assumed to have the following default behavior when handling null values. For example, for any sequence number, if an operator receives a null in one of its input channels, then that operator must: (1) consider the data on all other input channels of the same sequence to be null, (2) not change its internal state in any way, and (3) assign null to all output channels. With the default behavior, the scheduler is able to bypass the invocation of the operator if any of its input channels is null. As a result, the operator code does not have to handle null values. However, CRESP allows operators marked special to accept null values as optional input channels.

Even with the default behavior, an operator can assign null values to some of its output channels. Currently CRESP only allows operators to mark the current sequence number as deleted (equivalently assigning null to all of its output channels for this sequence number), but CRESP may allow an operator to assign null individually to its output channels. A null value of a channel causes the scheduler to bypass all non-special operators directly or indirectly depending on this channel, and their output channels are automatically set to null for the same sequence number. For the example in FIG. 2, if W3 generates null values, then W4, W5, and W6 are all bypassed and the results are not sent to the join operator even though some input channels are valid (e.g., the output channel of W2).

Using null output is one of two ways to implement efficient filters in a processing group. We will show the other way next.

Branching and Partitioning

CRESP keeps developers from "repeating themselves". CRESP allows a set of operators to be combined as a compound functioning as a single operator, so that this compound can be reused elsewhere. For now, CRESP only accepts synchronous compounds where the output channels of the elemental operators must share the same sequence numbers. Since a processing group itself is such a compound, we are essentially introducing a hierarchical structure for stream processing.

In addition to the above-mentioned simple compounds, we introduce two special forms of compounds: branching compounds and partitioning compounds. These two kinds of compounds are flow-level constructs, specified in the flow specification language and handled by the schedulers. The functionalities provided by these two kinds of compounds are traditionally implemented inside individual operators. By promoting them to the flow level however, repeated code of these operators are removed, resulting in much simpler operator implementations.

Branching Compounds

Figure 3:
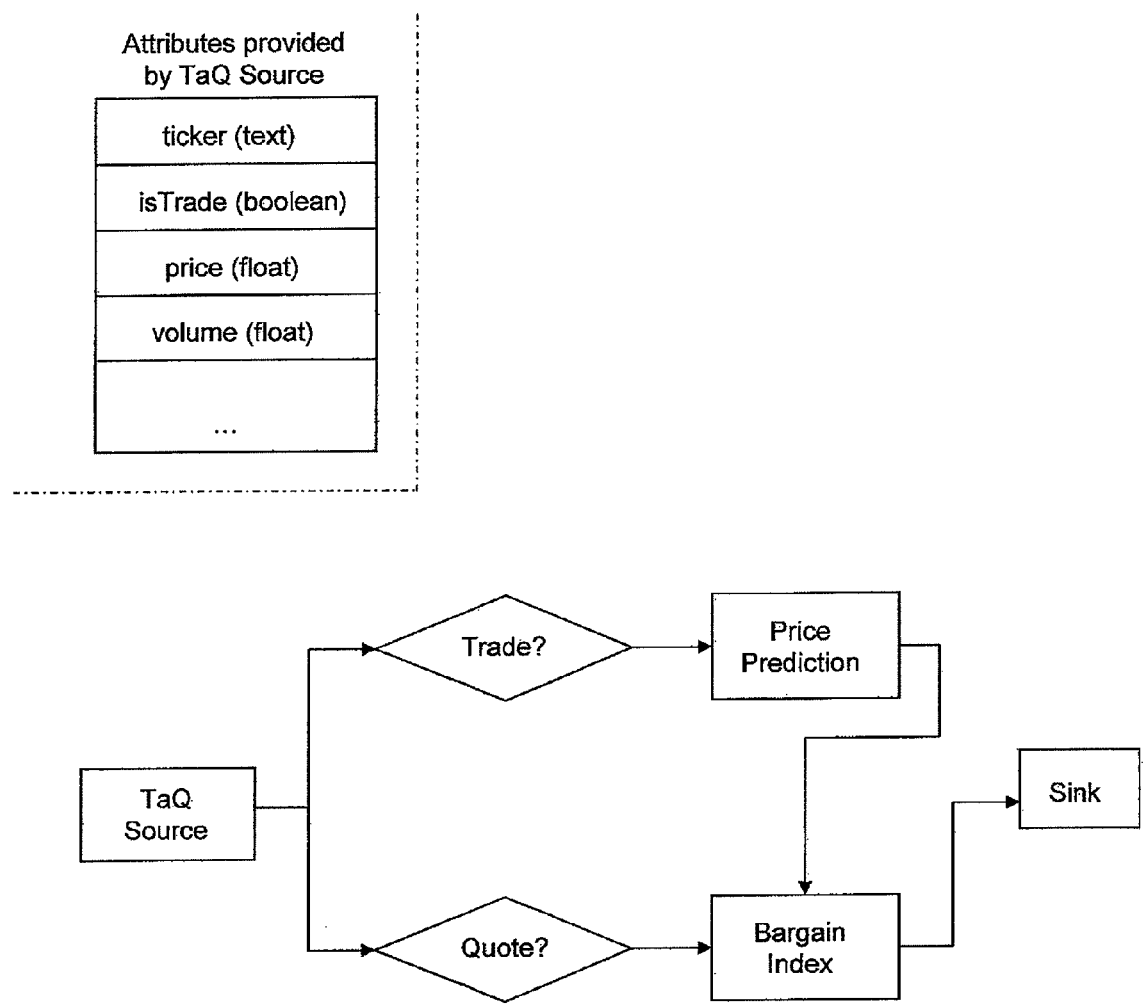
FIG. 3 is an example of a stream processing flow for processing stock trade-and-quote (TaQ) data.

In stream processing, filters are probably the most commonly used operators. FIG. 3 shows an example of a flow that processes trade-and-quote (TaQ) data from stock markets, described in a traditional asynchronous model. Each tuple of stock data contains several attributes, including a string ticker storing a stock symbol (e.g., IBM or MSFT), a Boolean isTrade, a price, and a volume. If isTrade is true, this tuple is a "trade", i.e., an actual transaction. In this case, the flow in FIG. 3 predicts a future price using the current and historical data of trade price and volume. Otherwise, the tuple is a "quote" for sale with the asked price and volume stored in the price and volume attributes respectively. In this case, a bar-gain index for this quote is estimated according to the most recently predicted price as well as the current asked price and volume from the tuple.

We can see in FIG. 3 that two parallel filters check the same flag isTrade. In order to eliminate such duplicated evaluations in these filters, we can either move the filters into the upstream source operator or the downstream processing operators. However, both options make the operator code complicated and less reusable, and still do not necessarily eliminate excessive data movement. The solution provided by CRESP is to introduce a flow-level construct, called conditional branching compounds, or simply branching compounds, described in the flow specification instead of within the operator code.

A branching compound has one or more branches, each of which contains a set of disjoint operators within a processing group. Depending on the value of a single channel (namely the predicate channel of this branching compound), for each sequence number, at most one of the branches is executed and all others are bypassed. The predicate channel must be provided by an operator outside of this compound. With the TaQ flow, the channel isTrade is the predicate, provided by the source operator. Predicate channels can be either boolean- or integer-valued, with a similar purpose as the control expression in the if-then-else or switch statement in traditional programming languages like Java. Currently in CRESP, branches are mapped to a single contiguous range of integers for integer-typed predicates; however, other types of channel values, such as non-contiguous integer numbers, strings, or even more complicated data types, can be converted to boolean or contiguous integer values by adding a predicate operator leading to a branching compound.

Now we have multiple options to implement a filtering operation. For example: (1) using a processing group containing a single filter operator (the typical synchronous way), (2) using a synchronous filtering operator that generates null values for unwanted sequence numbers, so that downstream operators are bypassed, and (3) using a branching compound.

Clearly, for parallel filters evaluating the same expression and generating disjoint outcomes, it is desirable to use the third option. For a single filter, we can use either of the last two options to replace the first option for higher efficiency. Between the last two, the third option is much easier to use in case the downstream operators are conditionally executed depending on a predicate channel that the operators themselves do not use. A branching compound effectively adds an implicit data dependency between the predicate channel and the operators within the branches.

Partitioning Compounds

In FIG. 3 the trades and quotes of many stocks happen concurrently, their data arrive interleaving each other. However, both price-prediction and bargain-index operators need to handle the data for each symbol separately and independently, and thus they have to maintain a look-up table to find correct information for the current stock symbol stored in the attribute "ticker". This look-up table complicates the operator code and negatively affects performance, as each operator must use and maintain its own copy of this table. The situation gets worse if the price-prediction operation is implemented by a compound of many smaller operators. To help simplification of the development process and encourage developers to use simple and reusable operators, CRESP provides another flow-level construct, called data partitioning compounds, or simply partitioning compounds.

A partitioning compound is a special compound with multiple instances. It has an associated key channel provided by an operator outside of this compound. For each value of the key channel, there is one and only one instance of the compound, and the scheduler maintains a look-up table for the key-compound mapping. Each instance of a compound contains a single, independent instance for each of its elemental operators. Note that an instance of an operator is the memory space used to store the states of the operator (not useful for stateful operators, though). The relation between an operator instance and the operator code is akin to the relation between a process and its executable program in operating systems, or between an object and its class in object-oriented programming languages.

For each sequence number, when a partitioning compound is executed, the scheduler first finds the corresponding instance of this compound according to the key value, replicates a new one if not found, and then searches within it for the instances of its elemental operators. For each key value, an operator within a partitioning compound uses a separate, independent state. Note that only the operator states are replicated for partitioning compounds, not channels, because each processing group has only one copy of each channel, including the key channel.

The partitioning compounds are used to implement the "group-by" logic of structured query langauge (SQL) in an efficient and generic way. A single partitioning compound may contain multiple operators, and therefore these operators share a single look-up table, not only saving memory space but also saving processing time for table look-ups. More important, the operators within the compound do not need to be aware of the existence of data partitions; rather, they can be implemented as if they are always handling the same key value. If a partitioning compound were used in the example of FIG. 3, the price prediction operator could just maintain the historical prices and volumes for a single stock symbol. In this case, this operator does not need to check the value of the channel ticker to find the correct historical data set; instead, the scheduler does the look-up for the operator and invokes it with the appropriate state. Generally, the partitioning compound relieves the operator code from implementing the "group-by" logic. For example, if a developer already has a generic operator computing the median of a channel, she may just apply this median operator to the price within a partitioning compound using the ticker channel as the partition key, then with no additional effort the median price for each stock symbol is obtained. In addition, as the scheduler has the full knowledge of partitioning compounds, it can use the information to automatically split the operator states across multiple threads or machines, without requiring any additional specifications. We refer to this mechanism as dynamic partitioning, and will discuss it later in this disclosure.

A Hierarchy of Compounds

The difference between the two special flow-level constructs is that a branching compound divides the operators whereas a partitioning compound divides the data, both depending on values of an outside channel. The two kinds of compounds can be used hierarchically. For example, a branching or a partitioning compound can be an elemental operator of a bigger branching or partitioning compound. As long as memory permits, CRESP allows an unlimited number of levels for compounds.

Figure 4A:
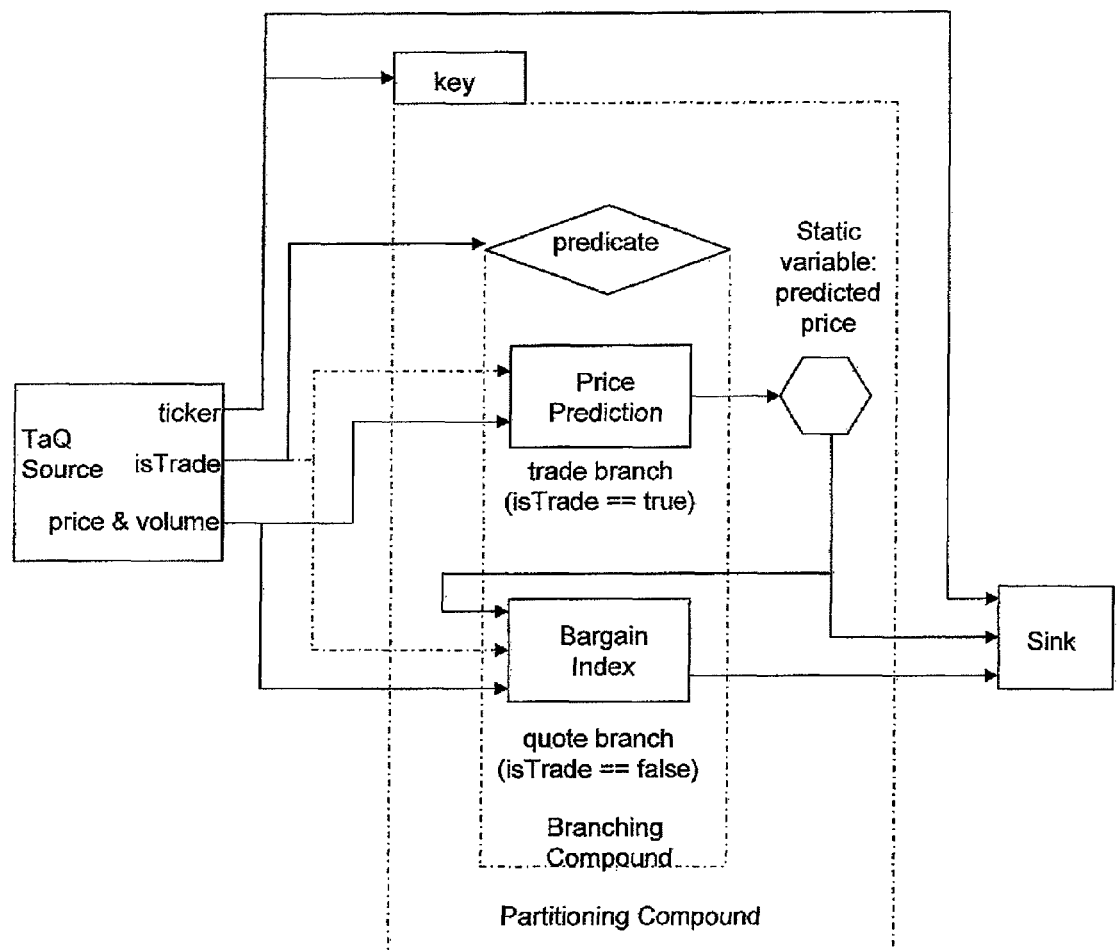
FIG. 4A is the TaQ application flow from FIG. 3 described with the CRESP model according to an exemplary embodiment of the present invention.
Figure 4B:
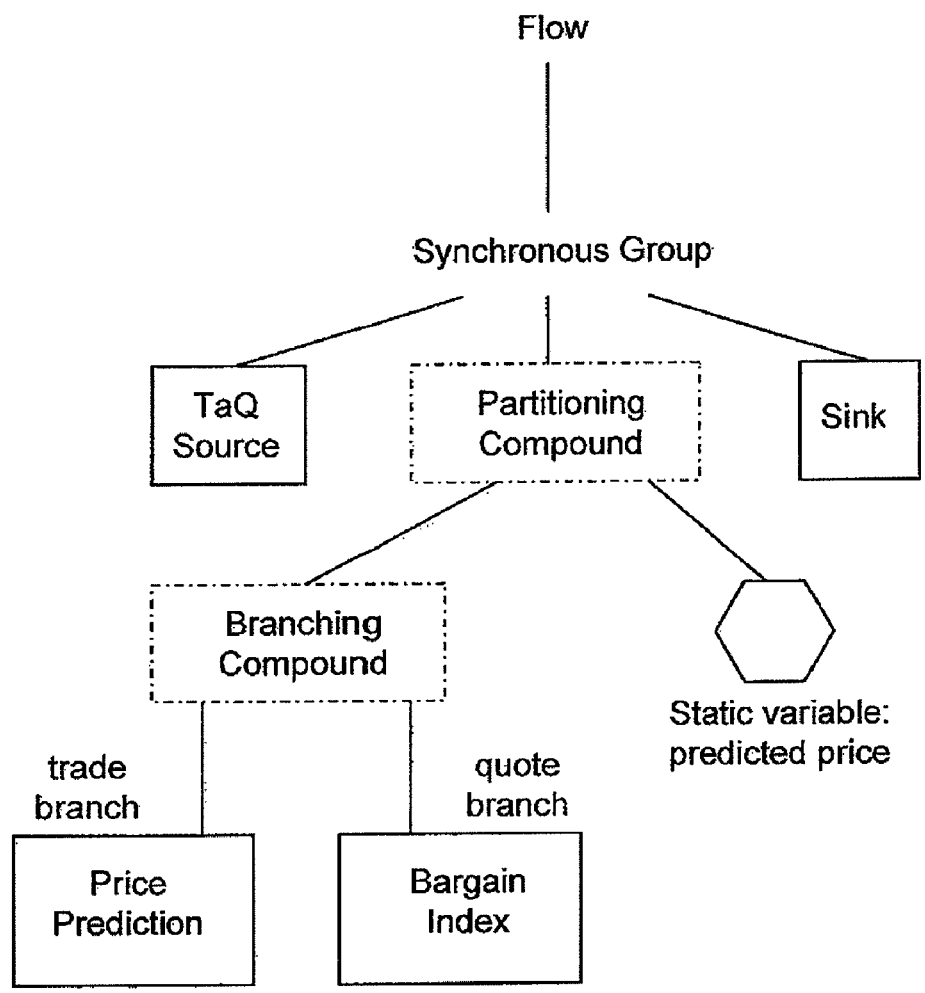
FIG. 4B is a hierarchical view of the flow in FIG. 4A.

FIG. 4A illustrates the flow using our CRESP model with a hierarchical structure of five levels shown in FIG. 4B. Each branch of the branching compound can be either an operator or a sub-compound, while the branching compound itself is in turn a sub-compound of the partitioning compound. The entire flow has only a single processing group with three elements, for example, a source, a sink, and a partitioning compound.

Note that in FIGS. 4A and 4B, we have a static channel marked as a hexagon. As we will see next, the static channel is used to forward the value from the trade branch to the quote branch. For example, it stores the predicted price computed according to the information of the most recent trade of the same stock.

Windows and Static Channels

Unlike functional programming languages, a stream processing system allows operators to maintain states. In other words, the output channel values of a stateful operator depend not only on the current input channel values, but also possibly on past values. Usually, users are responsible for maintaining past information in their operators. In CRESP, however, we provide two system-level mechanisms for simple storage of states: windows and static channels.

Windows. When an operator requests a channel as input, it gets only the current value of the channel (i.e., of the current sequence number). Frequently, an operator needs to check historical values of a channel, and therefore most of the stream processing systems have a concept of window. In CRESP, a window is a vector storing past values for a channel.

Static channels. A static channel is equivalent to a window of size one that has an initial value. Within a branching compound, a static channel can be assigned to one branch, and the most recently assigned value can be retrieved in a different branch, as seen in the example in FIGS. 4A and 4B. If instead we used a regular channel, its value would be null when the quote branch (containing the bargain index operator) is selected.

In CRESP, windows and static channels can appear at any level of the hierarchy of compounds, and their instances will be created for each value of the partitioning key if they are directly or indirectly under a partitioning compound. For example, in FIGS. 4A and 4B, since the static channel of predicted price belongs to a partitioning compound with the ticker as the key, the instance of this static channel obtained by the bargain index operator will always contain the last predicted price for the current stock symbol. Similarly, the price prediction operator can be implemented as a compound containing a window of recent prices. Placing this window under the partitioning compound automatically promotes a simple window to a partitioned window. In CRESP, the obtained instance of the window contains the historical prices only for the current stock symbol.

Decomposition

CRESP is designed such that common performance problems can be solved automatically when the flow is deployed in a real system, although developers may be able to provide or tune the solutions manually at their will. Decomposition aims to efficiently exploit concurrency for better performance results.

Communication Pairs

In CRESP, an unmodified flow can be only deployed within a single thread, by a micro scheduler. In order to execute a flow in multiple threads, processes, or machines we must decompose it into multiple sub-flows so that each of them can be deployed separately and executed concurrently. These sub-flows are connected by communication pairs. A communication pair is a pair of operators consisting of a sender and a receiver, connected with a communication link. The sender is a sink operator (a passive operator without output channels), whereas the receiver is a source operator (an active operator without input channels). In addition, a sender is also a special operator that can receive null values as input. The responsibility of the communication pair is to organize a set of channels from a single processing group into a sequence of tuples, and transfer them continuously from the sender's sub-flow to the receiver's sub-flow.

In general, a micro scheduler has no knowledge about communication links. For example, it handles senders and receivers in the same way as other kinds of sink and source operators. Therefore, when writing a communication pair, developers follow the same set of rules as writing other operators. In CRESP, we can implement two types of communication pairs: one based on a lock-free queue through shared memory and the other based on transmission control protocol (TCP) connections. In order to send data through a TCP connection, a sender has to serialize channel values to byte streams so that a receiver on the other side can deserialize them. With a lock-free queue, data of primitive types (e.g., numbers) are passed by values, and data of other types (e.g., lists and strings) are passed by reference. Immutable types allow operators scattered in multiple threads to share memory space for the same value without locking or replicating data. It is also possible to use shared internal memory space by using the copy-on-write technique.

Initialization of communication pairs. Each running instance of a communication pair is identified by a Globally Unique IDentifier (GUID). The two operators of a same pair are initialized with a same GUID. In CRESP, the GUID is a combination of the job identifier (assigned to the running instance of the entire flow when the flow is deployed) and the communication pair identifier (assigned to a communication pair when the flow is decomposed). How to use the GUID to build up a communication link during the initialization stage depends on the type of communication media and the implementation of the communication pair. For pairs communicating only within the same process, for example those based on shared queues, a process-level hash-map along with a lock suffices. For pairs communicating between machines, for example the TCP-based ones, we need a global coordinator to establish the communication. In CRESP, we can implement at least two different coordinators, one based on shared file systems and the other based on database management systems. In general, CRESP does not have any performance requirement for the initialization stage, and hence for the coordinator any reliable mechanisms can be used.

Flow control of communication links. Since both the sender and the receiver of a communication pair are regular operators, they provide the same set of scheduling metrics to the scheduler. Usually, senders and receivers maintain their own private buffers whose lengths can be used to calculate these metrics. In addition, this pair of operators may also exchange information including their buffer lengths, piggybacked on the channel data transmitted through the link. For each of the pair, information received from the other side can be used to report scheduling metrics more accurately. For links based on shared queues, the sender and receiver do exchange information including their buffer lengths.

Scalability and Flow Decomposition

CRESP achieves scalability with increasing workload by decomposing larger flow graphs into a number of smaller loosely coupled sub-flow graphs, replacing edges connecting sub-graphs with communication pairs. Each sub-flow can be scheduled standalone within a single thread or on a separate machine. The decomposition problem belongs to a class of graph partitioning problems that have been studied extensively in the literature. What we discuss here is how to build a set of deployable sub-flows with a given solution of flow decomposition.

In CRESP, a flow consists of set of processing groups. Hence, we have two scenarios for communication links: it is either within one processing group, or between two processing groups of the original flow. In the first scenario, we in fact decompose a processing group into multiple smaller synchronous ones connected by communication links. Let us discuss them separately.

Decomposition between processing groups. If the communication link is added between two processing groups, it must be replacing an existing subscription in the original flow. The procedure is as follows. In the group that provides the subscription data, a sender is added with subscribed channels wired to its input. In the group that consumes the data, a receiver that generates the subscribed channels is added, and all operators within the group using these channels are re-wired to the output of the receiver.

Decomposition within a processing group. We now consider how to decompose a single group into smaller synchronous sub-groups. For sub-groups A and B, we replace all edges directed from A to B with a single communication link, creating a sender at A and a receiver at B. A compound can be easily decomposed into multiple small compounds, even for special compounds such as branching and partitioning. If a special compound is decomposed, the branching predicate or the partitioning key must also be forwarded by communication pairs.

After decomposition, if a sub-group contains two receivers, before the output channels of these two receivers can be used, they must first be joined according to the sequence numbers. In CRESP, the sequence number is a scheduler generated special channel, which can be forwarded by a communication pair in the same way as other ordinary channels. Join operators need only the sequence numbers generated in the sub-group that contains at least one active operator from the original group. Further, the communication pairs need to forward the sequence numbers only if a join is added in some downstream groups of this pair. Note that, since each sub-group becomes a fill-fledged processing group and generates its own sequence numbers, the sequence numbers received from other sub-groups become ordinary channels.

Figure 5A:
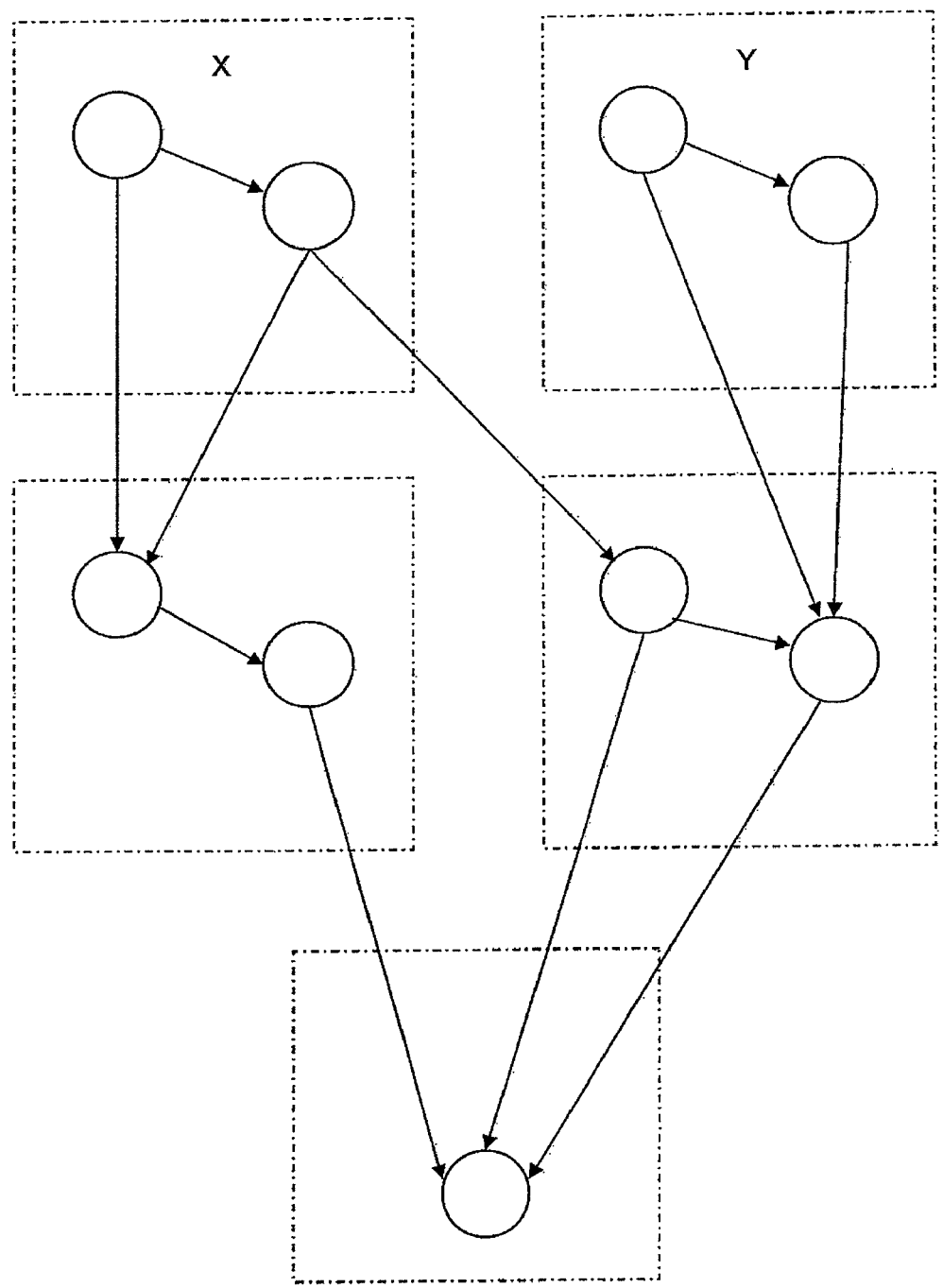
FIG. 5A is the first part of an illustrative example of flow decomposition according to an exemplary embodiment of the present invention and shows an original flow containing a single processing group.
Figure 5B:
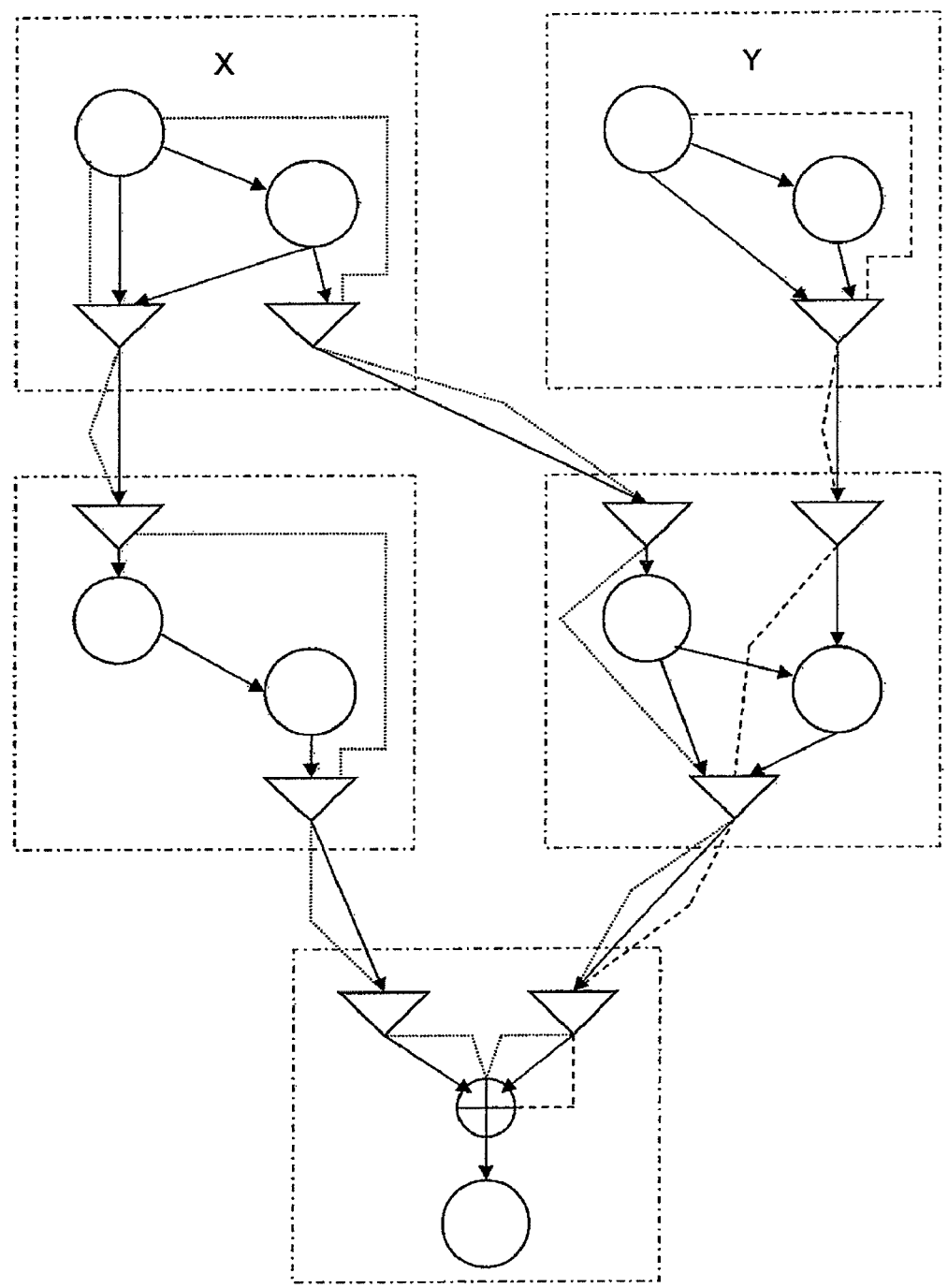
FIG. 5B is the second part of the illustrative example of flow decomposition according to an exemplary embodiment of the present invention and shows five decomposed sub-flows, each of which contains a single processing group.

FIG. 5B illustrates the decomposed flow of the single processing group shown in FIG. 5A. It contains five sub-flows with five communication pairs added between them, shown as five pairs of triangles. Two active operators in the original flow are marked with X and Y, respectively. The propagation paths of the sequence numbers generated by X and Y are shown by the dotted and dashed lines, respectively, in FIG. 5B. In the bottom-most sub-flow, since both receivers provide a channel for sequence numbers generated by X, we have to add an operator in this sub-flow to join the output of the two receivers, according to the two sequence number channels originated from X. On the other hand, as only one receiver provides the sequence numbers generated by Y, the join operator can simply pass through the output channels of this receiver when the sequence numbers are originated from Y. Note that this join can be implemented as a special passive operator because it is executed only after either of the receivers (as active operators) is executed.

Dynamic Data Partitioning

The flow decomposition achieves parallelism by dividing operators. There is another way to achieve parallelism. For example, we can divide data into disjoint subsets and process each subset in different threads, similar to what a partitioning compound does. Specifically, a data partitioning method divides sequence numbers into N disjoint sub-sequences, and assigns them to N threads. All channel values whose sequence numbers fall into a subset are sent to the corresponding thread. Instead of moving some of the operators to other threads in flow decomposition methods, with data partitioning we replicate all operators of a compound to each of the N threads. We can even replicate a whole processing group, as it is a special case of a compound.

Problems arise if the replicated operators maintain their internal states. There is no general way to share states efficiently across machines. In a multi-threaded environment, operators may achieve reasonable performance improvement by sharing states using mutexes. However, CRESP avoids concurrent programming for operators and can eliminate locks as much as possible. Hence, CRESP does not support replication of arbitrary stateful operators to achieve parallelism through data partitioning.

Nevertheless, we can exploit existing partitioning compounds for data partitioning even with stateful operators. Remember that, during its execution, a partitioning compound already has multiple instances. We can divide all instances of the compound into N subsets, and place them in N threads so that we can execute these instances in parallel. More important, we can use a dispatcher to decide which thread to send the data for a particular key value. Further, the dispatcher can also function as a migrator that can move these instances from one thread to another, even across different machines, is framework of using data partitioning over an existing partitioning compound is referred to as dynamic data partitioning.

Figure 6A:
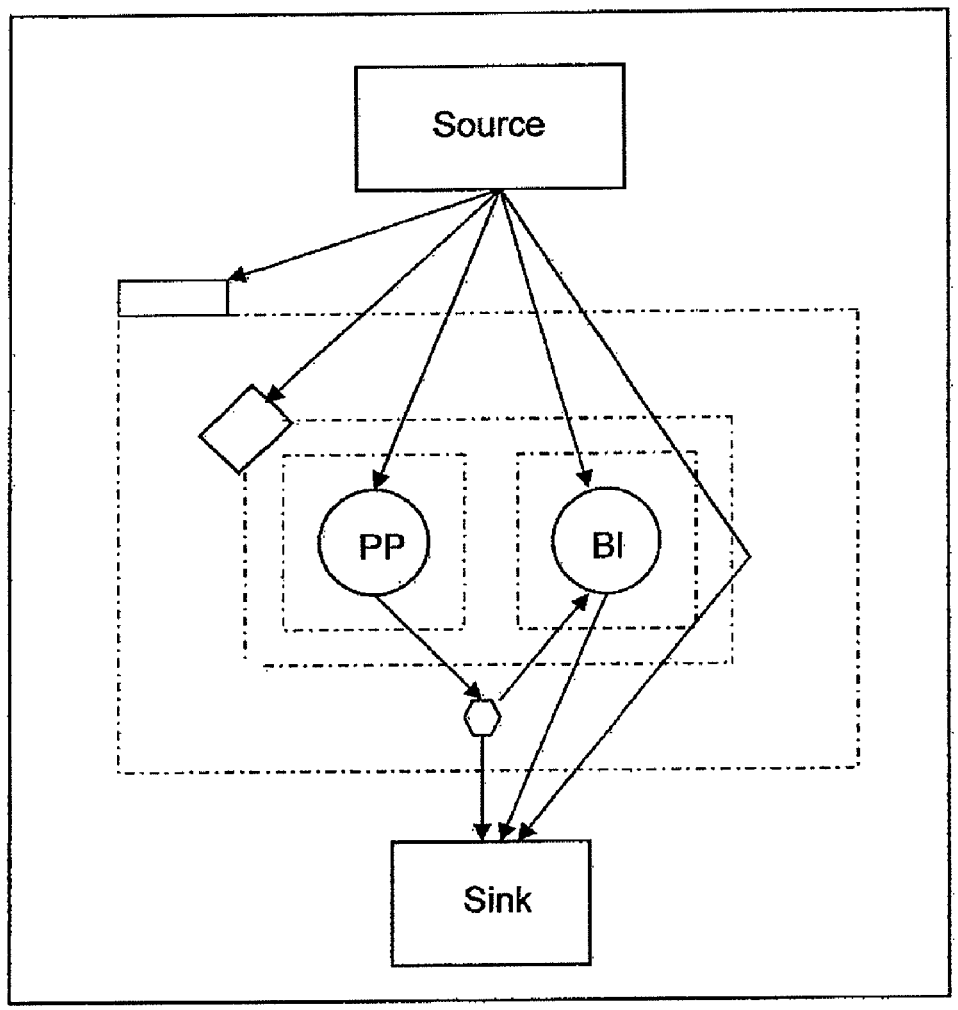
FIG. 6A is the first part of an illustrative example of dynamic data partitioning according to an exemplary embodiment of the present invention and shows an original flow that contains a single processing group.
Figure 6B:
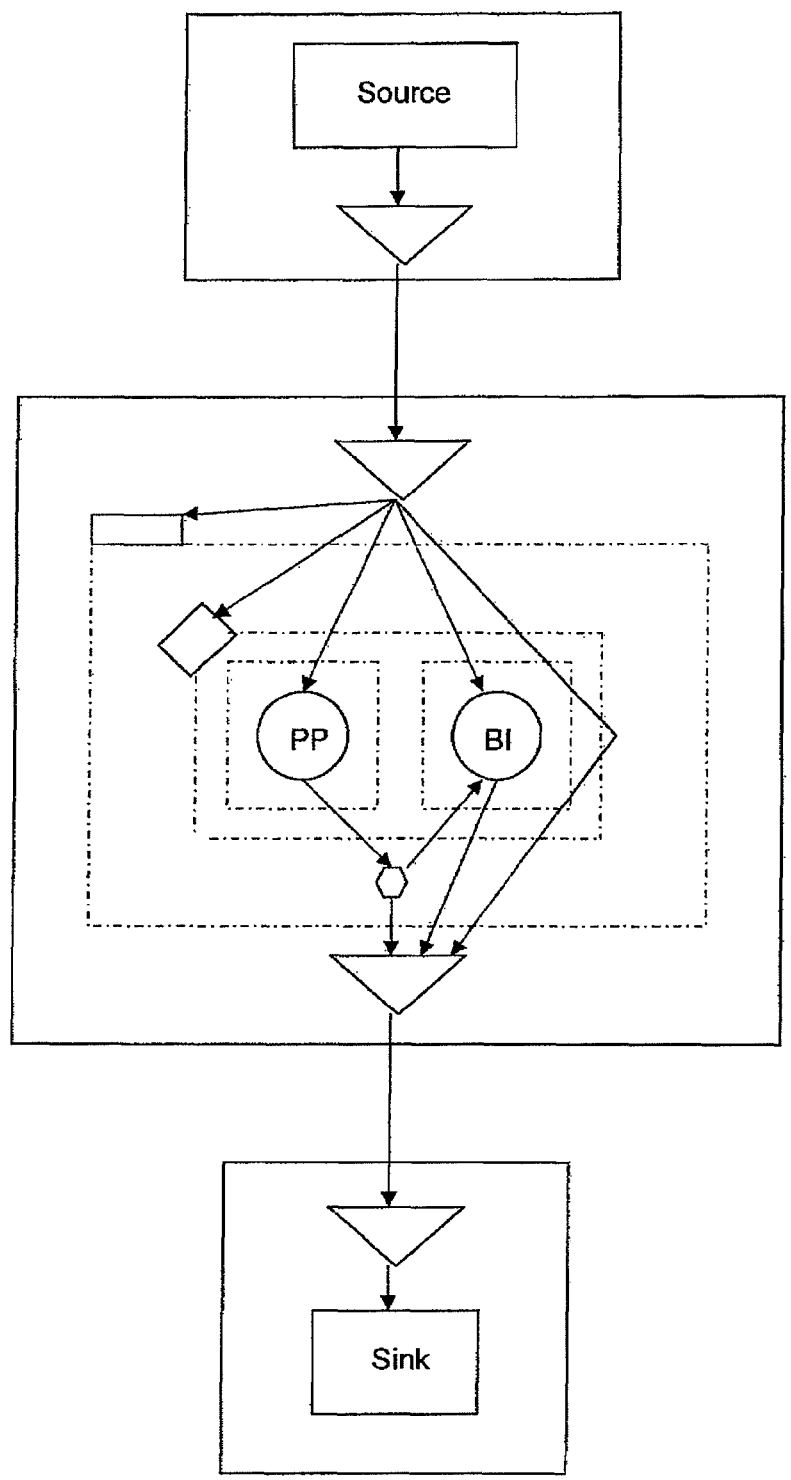
FIG. 6B is the second part of an illustrative example of dynamic data partitioning according to an exemplary embodiment of the present invention and shows the flow of FIG. 6A decomposed into three sub-flows.
Figure 6C:
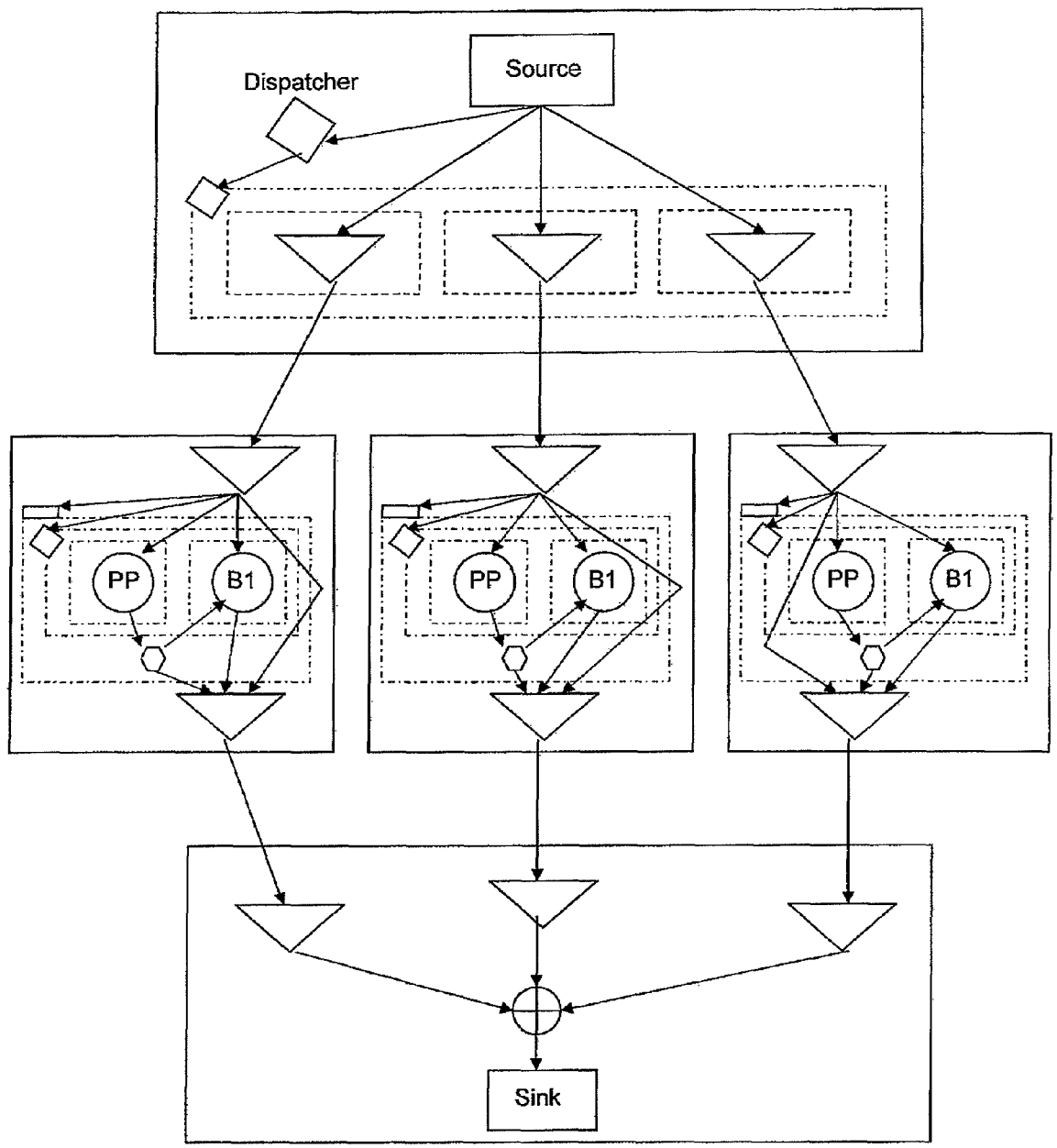
FIG. 6C is the third part of an illustrative example of dynamic data partitioning according to an exemplary embodiment of the present invention and shows the results of a replication.

FIGS. 6A-C illustrate the procedure of dynamic data partitioning for the TaQ flow shown in FIGS. 4A and 4B. Specifically, dynamic data partitioning consists of the following steps to build deployable sub-flows:

1. First, use the method introduced in the scalablity and flow decomposition section to decompose the processing group in order to remove the partitioning compound from the group. We assume that all upstream operators of the compound are in a processing group called head, and downstream operators are in a processing group called tail. Note that if the head and the tail are connected after the removal of the compound, we need to decompose them using another communication pair. The tail may be empty if the channels generated in the partitioning compound are not used outside of the compound. The partitioning compound then becomes a separate processing group called body. Two communication pairs are added: one from the head to the body, and the other from body to the tail. If the tail is empty, we can save the latter pair. See the changes between FIGS. 6A and 6B for this step.
2. Replicate the partitioning compound, including added communication pairs, to a total of N copies.
3. Add a dispatching operator and a branching compound containing N branches in the head. The dispatcher's output channel is used as the predicate of the branching compound, and its input is the original key channel for the partitioning compound.
4. Move the N senders into the branching compound and make each of them a separate branch.
5. If the tail is not empty, add a join operator in the tail to merge all data from the receivers. This join operator, again, can be implemented as a passive operator. See the changes between FIGS. 6B and 6C for the last four steps.

Note that the dispatcher has to remember its key assignments for branches, by maintaining another look-up table. In FIGS. 6A-C, the join operator merges its N inputs into one, a very efficient operation that does not need to maintain any internal states. If a tail requires data to be in the same order as in the head, we also need a sorting operator using the sequence numbers generated in the head as the sorting key, in which case all communication pairs have to forward the channel of sequence numbers from the head. This case is not shown in FIGS. 6A-C, though.

In CRESP, communication pairs support a unified stream processing framework for both multi-core computing and cluster computing. These pairs are devised to be inserted by algorithms that decompose an application flow into multiple pieces, rather than manually by developers. In order to achieve better performance with a given configuration of hardware, decomposition algorithms can inspect flow specifications, apply user-specified cost estimates for operators, take suggestions for operator placement from users, and/or even utilize profiling tools to obtain performance measurements of a flow and its operators. It is even possible to change the decomposition of a running flow by, for example, suspending it and re-deploying it, without interrupting the flow or requiring user involvement.

It is noted that an application flow in CRESP be first designed without extensive considerations of asynchronous parallelism. For example, in CRESP, developers are encouraged to design a processing group as large as possible for efficient synchronous execution, if doing so will not complicate the flow. The flow is hitherto decomposed into multiple pieces by decomposition algorithms to scale in an asynchronous environment. If developers are not satisfied with the decomposition result, they can always add annotations in the flow specification, instructing schedulers to use specified placements.

Figure 7:
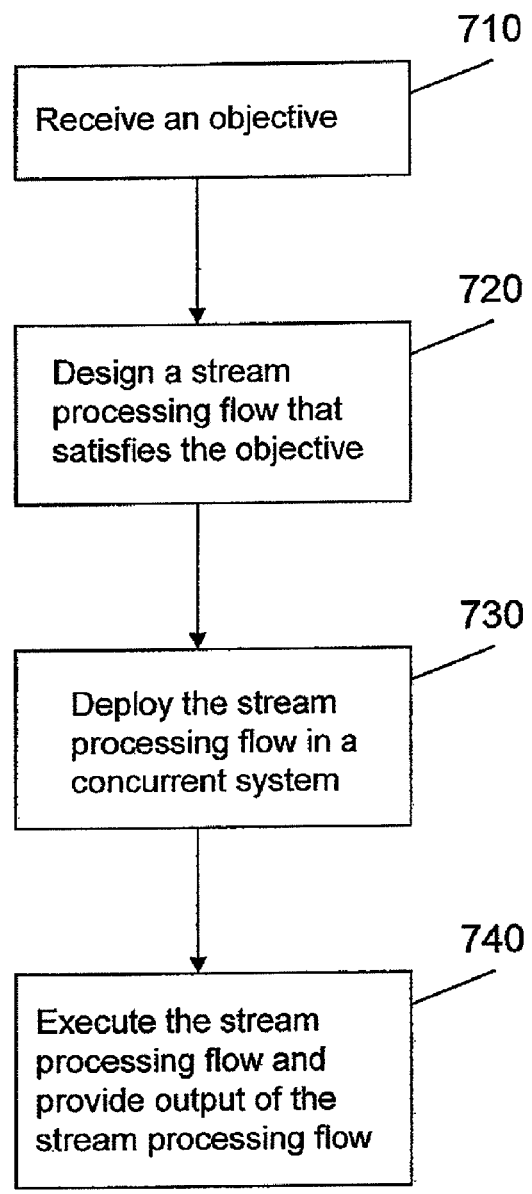
FIG. 7 is a flow diagram that illustrates a method according to an exemplary embodiment of the present invention.

FIG. 7 is a flow diagram that illustrates a method according to an exemplary embodiment of the present invention. As shown in FIG. 7, an objective is received (710). The following is an example of what may take place in step 710. Consider a real-world scenario where an analyst is going to predict the natural gas consumption of the next few months for a list of geological areas. Available data includes historical consumption of natural gas and other utility for these areas, as well as past weather records. The objective of the analyst is to design a stream processing flow that uses these historical records as input and provides natural gas predictions for the next few months as output.

As Her shown in FIG. 7, a stream processing flow that satisfies the objective is designed (720). In line with the above-scenario, the following is an example of what may take place in step 720. The analyst designs the flow to include three processing groups similar to what is shown in FIG. 2 with the help of a design tool (i.e., a program). The weather records are fed into the weather processing group of FIG. 2. This group contains operators that compute various metrics (e.g., average temperature and heat index of an area) and operators that build and use a weather forecast model to calculate per-month weather metrics for future months. Below is an example of pseudo code for the weather processing group designed or acquired from a library by the analyst.

```
group wp = // Weather processing
{
    sc1,sc2,sc3 = WeatherDataSource( );
    c1 = W1(sc1);
    public c2 = W2(c1,sc2);
    c3 = W3(sc3);
    public c4 = W4(c2,c3);
    public c5 = W5(c2,sc2,c3);
    public c6 = W6(c4,c2,c5);
}
```

The historical natural gas consumption records are fed into the energy processing group of FIG. 2. This group contains operators that convert and aggregate data to a usable form. Below is an example of pseudo code for the energy processing group designed or acquired from a library by the analyst.

```
group ep = // Energy processing
{
sc1,sc2 = EnergyDataSource( );
c1 = E1(sc1);
public c2 = E2(c1);
public c3 = E3(c2);
public c4 = E4(c2,c3);
}
```

Then the outputs of these two groups are joined together in the joint processing group of FIG. 2. Operators within this group will fit and use an energy-consumption model to predict future usage of natural gas for each area, depending on both weather forecast and historical electricity consumption of the area. Below is an example of pseudo code for the joint processing group designed or acquired from a library by the analyst.

```
group jp = // Joint processing
{
output sc1,sc2,sc3 = join( wp.c2, wp.c4, ep.c2,
wp.c5==ep.c3 && wp.c6>ep.c4);
c1 = P1(sc2);
output c2 = P2(sc3);
output c3 = P3(c1,sc2,c2);
}
```

With this stream processing flow, data is processed synchronously within each of the groups, whereas joint processing group asynchronously joins data from the weather and energy groups.

As further shown in FIG. 7, the stream processing flow is deployed in a concurrent system (730). The following is an example of what may take place in step 730. After the designer finalizes the flow, the flow is deployed by a deployment tool. The processing groups may be further decomposed into small processing groups by this tool if necessary. Then each decomposed processing group is assigned to a computer thread, and the flow is distributed over a network of computers.

As further shown in FIG. 7, the stream processing flow is executed and an output of the stream processing flow is provided (740). The following is an example of what may take place in step 740. Each processing group (even including those after decomposition) is executed within its assigned thread. The output of a group is sent to other groups through communication links, which are built on either shared memory (if both the source and the destination of the link are on the same computer), or on lower-level network connections of any kind (e.g., TCP/internet protocol (IP)). The predicted natural gas consumption data is then provided by the last operator of the joint processing group in FIG. 2 (note this operator is usually a sink) and is then received by a user (via a display) or stored in a database.

Figure 8:
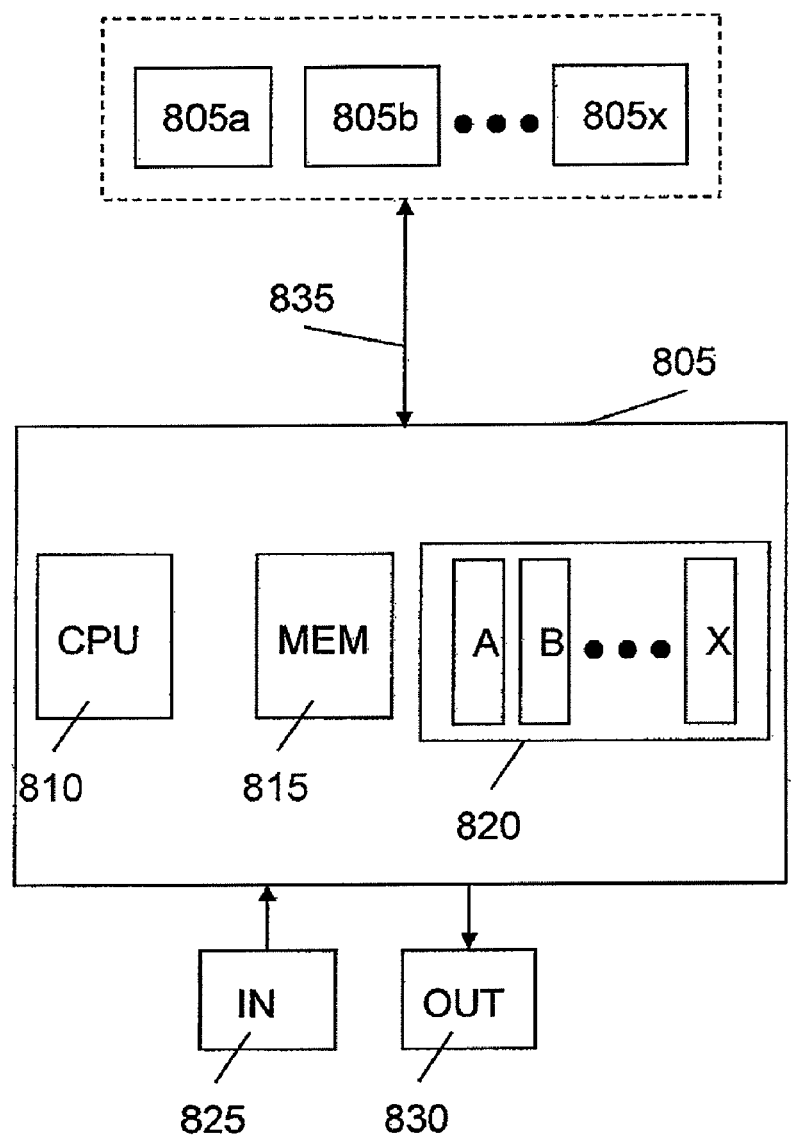
FIG. 8 is a block diagram of a system in which exemplary embodiments of the present invention may be implemented.

FIG. 8 is a block diagram of a system in which exemplary embodiments of the present invention may be implemented. As shown in FIG. 8, a computer 805, which may be a laptop computer, workstation or server, includes a multi-core CPU 810, a memory 815 and a module or module set 820 that includes program code for executing methods in accordance with exemplary embodiments of the present invention. The computer 805 is coupled to input and output devices 825 and 830 and other similar computers 805a, b . . . x via a network 835. The memory 815 includes random access memory (RAM) and read only memory (ROM). The memory 815 can also include a database, disk drive, tape drive or a combination thereof. The input 825 is constituted by a keyboard or mouse and the output 830 is constituted by a display or printer. The network 835 may be the Internet, for example.

It should be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. An apparatus, comprising:
a memory device for storing a program; and
a processor in communication with the memory device, the processor operative with the program to:
facilitate design of a stream processing flow that satisfies an objective,
wherein the stream processing flow includes at least three processing groups, wherein a first processing group includes a data source and at least one operator, a second processing group includes a data source and at least one operator and a third processing group includes a join operator at its input and at least one other operator,
wherein data inside each group is organized by channels and each channel is a sequence of data, wherein an operator producing a data channel does not generate new data for the channel until old data of the channel is received by all other operators in the same group, and wherein data that flows from the first and second groups to the third group is done asynchronously and is stored in a queue if not ready for processing by an operator of the third group; and deploy the stream processing flow in a concurrent computing system to produce an output.

2. The apparatus of claim 1, wherein a data channel inside each group is a sequence of values of the same type.

3. The apparatus of claim 2, wherein data channels of the same group share the same sequence of sequence numbers or timestamps.

4. The apparatus of claim 2, wherein each data channel of a group receives its values from a single operator and operators in the group can use any channel in the group as an input, on the condition that there are no dependency loops or cycles within the group.

5. The apparatus of claim 1, wherein operators in the same group are scheduled sequentially in a fixed order and instructions of an operator are executed continuously without overlapping in time with instruction of any other operators in the same group, and wherein instructions of operators belonging to different groups can be executed in parallel in any order.

6. The apparatus of claim 1, wherein the processor is further operative with the program to:
decompose a group of the stream processing flow into a plurality of smaller groups.

7. The apparatus of claim 6, wherein a pair of sender/receiver operators is inserted between the smaller groups if a link in the stream processing flow is broken by the decomposition, and wherein data between a sender/receiver pair can be stored in a queue.

8. The apparatus of claim 6, wherein a join operator is inserted into a smaller group if the smaller group into which it is inserted requires data from two or more smaller groups as a result of the decomposition.

9. The apparatus of claim 1, wherein the operators are stored in a library.

10. The apparatus of claim 1, wherein the operators are designed by a user.

11. The apparatus of claim 1, wherein a description of the stream processing flow is received from a user or is computer-generated.

12. An apparatus, comprising:
a memory device for storing a program; and
a processor in communication with the memory device, the processor operative with the program to:
facilitate design of a stream processing flow that satisfies an objective,
wherein the stream processing flow includes at least one processing group that includes a data source and at least one operator or at least one compound, and wherein the at least one compound includes at least one operator or at least one smaller compound,
wherein data inside one or more processing groups is organized by channels and each channel is a sequence of data, wherein an operator producing a data channel does not generate new data for the channel until old data of the channel is received by all other operators in the same group, and
wherein data that flows from one processing group to another is done asynchronously and is stored in a queue if not ready for processing by an operator of the receiving processing group; and
deploy the stream processing flow in a concurrent computing system to produce an output.

13. The apparatus of claim 12, wherein the at least one compound is a branching compound if it has multiple disjoint branches, each branch contains multiple operators, and depending on a condition, only one of the branches is executed for each input when the stream processing flow is deployed.

14. The apparatus of claim 12, wherein the at least one compound is a partitioning compound replicated for each value of an associated key channel, and wherein for each input depending on the value of the key channel only one copy of the at least one compound is executed when the stream processing flow is deployed.

15. The apparatus of claim 14, wherein the partitioning compound is replicated throughout multiple computers depending on the value of the key channel when the stream processing flow is deployed.

16. The apparatus of claim 12, wherein the processor is further operative with the program to:
build deployable sub-flows, wherein the processor is further operative with the program when building deployable sub-flows to:
decompose the at least one processing group into a plurality of separate processing groups,
wherein the plurality of separate processing groups includes a first processing group that includes all upstream operators of a partitioning compound, a second processing group that includes all downstream operators of the partitioning compound and a third processing group that includes the partitioning compound and wherein sender/receiver pairs are added between the first to third processing groups;
replicate the partitioning compound and the added sender/receiver pairs to a number of copies;
add a dispatch operator and a branching compound containing the same number of branches to the first processing group;
move senders into the branching compound and make each of them a separate branch of the branching compound; and
add a join operator to join data received from the copies of the partitioning compound.

17. The apparatus of claim 12, wherein the at least one operator or at least one compound is stored in a library.

18. The apparatus of claim 12, wherein the at least one operator or at least one compound is designed by a user.

19. The apparatus of claim 12, wherein a description of the stream processing flow is received from a user or is computer-generated.

20. One or more non-transitory computer readable media having stored thereon a plurality of instructions that, when executed by one or more processors, causes the one or more processors to:
facilitate design of a stream processing flow that satisfies an objective,
wherein the stream processing flow includes at least three processing groups, wherein a first processing group includes a data source and at least one operator, a second processing group includes a data source and at least one operator and a third processing group includes a join operator at its input and at least one other operator,
wherein data inside each group is organized by channels and each channel is a sequence of data, wherein an operator producing a data channel does not generate new data for the channel until old data of the channel is received by all other operators in the same group, and
wherein data that flows from the first and second groups to the third group is done asynchronously and is stored in a queue if not ready for processing by an operator of the third group; and deploy the stream processing flow in a concurrent computing system to produce an output.

21. One or more non-transitory computer readable media having stored thereon a plurality of instructions that, when executed by one or more processors, causes the one or more processors to:

facilitate design of a stream processing flow that satisfies an objective, wherein the stream processing flow includes at least one processing group that includes a data source and at least one operator or at least one compound, and wherein the at least one compound includes at least one operator or at least one smaller compound, wherein data inside one or more processing groups is organized by channels and each channel is a sequence of data, wherein an operator producing a data channel does not generate new data for the channel until old data of the channel is received by all other operators in the same group, and wherein data that flows from one processing group to another is done asynchronously and is stored in a queue if not ready for processing by an operator of the receiving processing group; and deploy the stream processing flow in a concurrent computing system to produce an output.

* * * * *